M. J. HUGGINS.
SPEED CONTROLLING MECHANISM FOR AUTOMOBILES.
APPLICATION FILED AUG. 30, 1915.
1,314,063.
Patented Aug. 26, 1919.
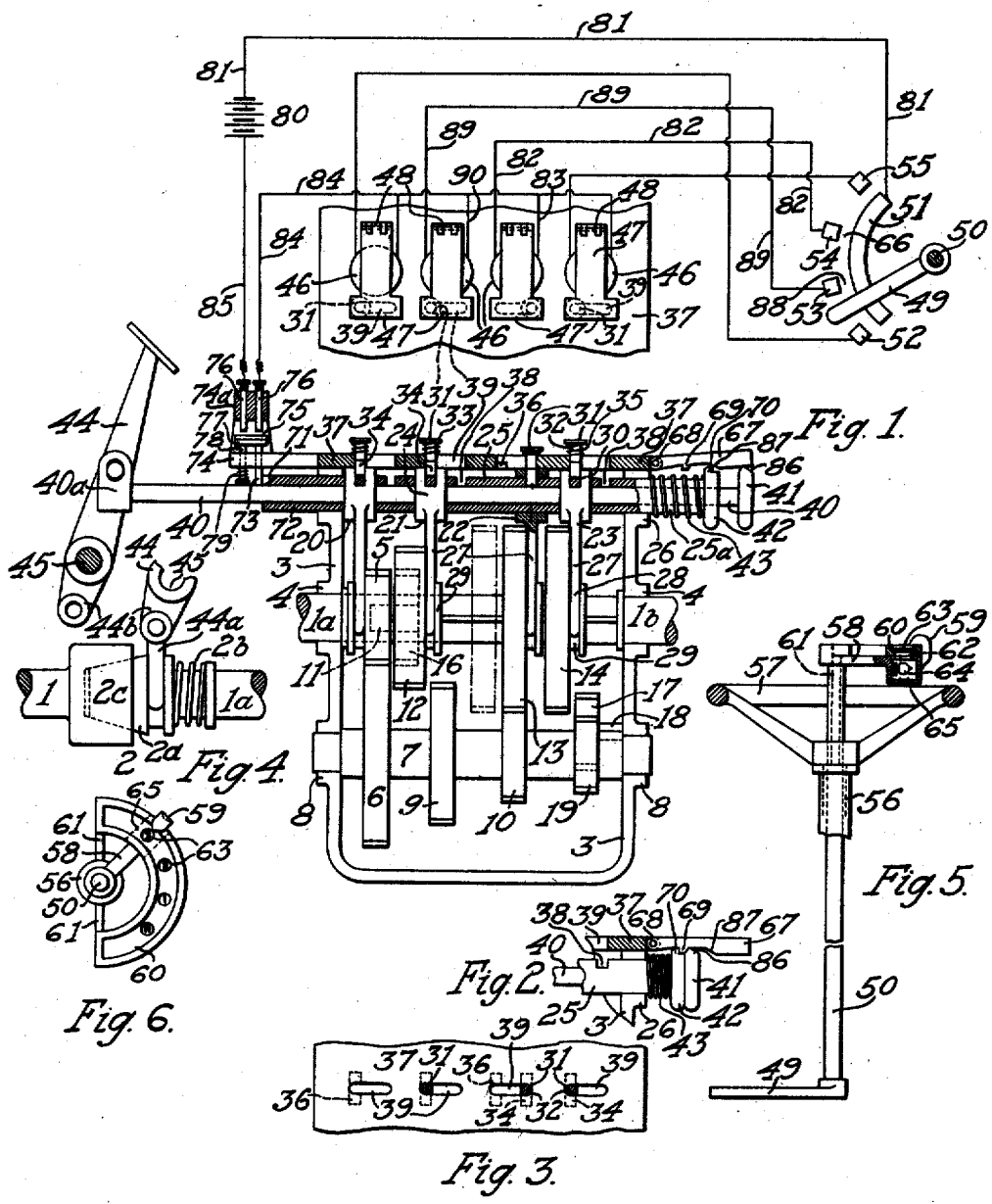

UNITED STATES PATENT OFFICE.

MERION J. HUGGINS, OF NEW YORK, N. Y., ASSIGNOR TO AUTOMOTIVE DEVELOPMENT CO., INC., OF NEW YORK, N. Y., A CORPORATION OF NEW YORK.

SPEED-CONTROLLING MECHANISM FOR AUTOMOBILES.

1,314,063.   Specification of Letters Patent.   Patented Aug. 26, 1919.

Application filed August 30, 1915. Serial No. 48,021.

*To all whom it may concern:*

Be it known that I, MERION J. HUGGINS, a citizen of the United States, and resident of the city of New York, in the county of Kings and State of New York, have invented certain new and useful Improvements in Speed-Controlling Mechanism for Automobiles, of which the following is a specification.

This invention relates to automobiles, particularly to the speed controlling mechanism thereof, and its principal object is to provide simple, efficient, reliable, and improved means for controlling the speed of the automobile, and for driving the automobile wheels at a variable speed relatively to the speed of the engine or prime mover.

Another object is to provide improved, conveniently operated, and readily responsive means for controlling the changing of the speeds and reversing of the wheels.

Other objects and advantages will hereinafter appear.

In the accompanying drawings,—

Figure 1 is a general view, partly in section and partly in full, showing a plan view of an automobile gear transmission, to which the invention is here shown as adapted, with the operating mechanism therefor and a diagram of the electric circuits in connection therewith.

Fig. 2 shows a fragmentary elevation of a detail of said mechanism.

Fig. 3 shows a fragmentary plan view of another detail of said mechanism.

Fig. 4 is an elevation of the clutch for the engine drive-shaft.

Fig. 5 shows an elevation of a device for closing said circuits, and an indicator for the circuits.

Fig. 6 is a plan view of the indicator shown in Fig. 4.

A shaft 1, driven by the automobile engine, not shown, drives a section $1^a$ thereof, which is split therefrom at clutch 2 and extends to the gear-casing 3 where it is mounted in bearings 4 of said casing. The shaft-section $1^a$ carries a gear 5 which drives a gear 6 that is keyed upon and drives a countershaft 7 mounted in bearing 8 of said casing. Said countershaft carries drive-gears 9 and 10 of different sizes, and the rear shaft-section $1^b$ of the drive shaft, split from shaft-section $1^a$ at 11 and running independently thereof, carries coöperating transmission gears 12, 13 and 14 splined to shift thereupon, so that any one of said transmission gears may be caused to mesh with and unmesh from its coöperating drive gear on said countershaft, and various speeds may be thereby transmitted to the shaft $1^b$, which in turn drives the wheels of the automobile, not shown, at various speeds. Thus when the gears 12, 13, 14 are all unmeshed, the countershaft 7 driven by gears 5, 6 from shaft-section $1^a$ runs idly and no motion is transmitted to the shaft-section $1^b$, and when the gears 13, 10 are meshed, as shown in the drawing, a slow speed is imparted to the shaft-section $1^b$. Likewise, when the gears 12, 9 are meshed a higher speed is transmitted to the shaft $1^b$, and when the gear 5 is unmeshed from its coöperating gear 6 and is shifted to mesh with a coöperating internal gear 16 formed in gear 12 the shaft-section $1^b$ is driven at highest speed, directly from shaft-section $1^a$, and without effecting the countershaft 7 with the gears mounted thereupon, which thus remain stationary during this direct driving of shaft-section $1^b$ from shaft-section $1^a$, and needless wearing out of the bearings of shaft 7 and of the gears thereupon is thereby prevented. In order to rotate the shaft $1^b$ oppositely for reversing the automobile wheels, the gear 14 is meshed with an intermediate idler-gear 17, which is mounted on a stud 18 fixed to casing 3 and is driven by a drive-gear 19 carried upon the counter-shaft 7. The gears are meshed and unmeshed by means of shifting devices 20, 21, 22, and 23, which comprise hubs 24 carried upon a sleeve 25 mounted in guiding lugs 26 of casing 3, arms 27 extending from said hubs, and forked portions 28 at the extremities of said arms that embrace shouldered collars 29 of the shiftable gears.

Within a notch 30 in the hub 24 of each shifting device is carried a locking-latch 31 consisting of a pin 32 having a flange 33 and a flattened portion 34 the lower part of which is located within the notch 30. And normally a spring 35 surrounding said pin presses against said flange and lodges the upper part of the portion 34 within a receiving recess 36 formed in a plate 37 secured to the casing 3, whereby the shifting device is firmly maintained locked and shifting thereof is prevented, while the gear carried thereby is maintained locked in unmeshed state. The sleeve 25 is shiftable longitudinally toward the left and back toward the right, as viewed in the drawing, through the guiding lugs 26 and through the hubs 24 of the shifting devices 20, 21, 22, 23, and a stroke may be imparted to said sleeve, first forwardly from the initial position shown toward the left and then backwardly to the initial position. In the sleeve 25 are formed notches 38 which register with the latches 31 when said sleeve is at the end of the forward portion of its stroke, and upon pressing down any one of the latches 31, contrary to spring 35, toward said sleeve, just before it is shifted or just before it has completed the forward portion of its stroke, the upper part of its flat portion 34 is caused to leave the recess 36 in plate 37 and the lower part of this portion is compelled to enter its registering notch 38 in sleeve 25, whereby the particular shifting device carrying said latch is thus unlocked from the plate 37 and locked firmly to the sleeve 25. And hence, upon the backward portion of the stroke of sleeve 25 said locked shifting device is carried therewith and shifted toward the right, as viewed in the drawing, and the transmission gear carried by this shifting device is thereby shifted and meshed with its coöperating drive gear upon shaft 7. Conversely, during the forward portion of a subsequent stroke of the sleeve 25 the shifting device previously locked thereto is shifted back toward the left and the spring 35 pressing the flange 33 of the latch 31 carried by said device causes the latch-portion 34 to reënter its recess 36, whereby the shifting device is restored to initial locked position and the gear carried thereby is unmeshed. Upon the backward portion of the same subsequent stroke the sleeve 25 either returns idly or together with any one of the other shifting devices that may have been locked thereto. During the movement of the shifting device its latch 31 is carried along therewith and the lower part of portion 34 of the latch is maintained within the notch 38 by the plate 37 bearing upon the upper face of flat portion 34 of the latch, the pin 32 of said latch being meanwhile retained within an elongated slot 39 in plate 37, Figs. 1 and 3. The sleeve 25 is actuated to perform its strokes by means of a rod 40 passing through its bore. Moving of the rod 40 longitudinally toward the left, as viewed in the drawing, causes a head 41 at the extremity thereof to bear against a head 42 secured to the extremity of the sleeve 25, Fig. 2, and it thereby shifts said sleeve to perform the forward portion of its stroke toward the left. This movement of the sleeve 25 simultaneously compresses a spring 43, which surrounds the sleeve-end 25$^a$ protruding from the casing 3 and presses against the sleeve-head 42 and the casing-lug 26. Upon moving of the rod 40 backwardly to the position shown in Fig. 1 it permits the spring 43 to shift the sleeve 25 toward the right to thus perform the backward portion of its stroke. The rod 40 is pivoted at its opposite extremity 40$^a$ to a foot-pedal 44, fulcrumed at 45, that operates the drive-shaft clutch 2, whereby upon pressing of said foot-pedal to swing it toward the left and releasing it to permit its return-swinging toward the right the rod 40 is actuated to shift first toward the left and then toward the right, and in conjunction with the action of spring 43 said rod moves the sleeve 25 to perform its forward and backward stroke in the above described manner. Said pedal is connected to the clutch 2 by means of a forked arm 44$^a$ which is joined to the pedal-extremity 44$^b$ and embraces the cone-portion 2$^a$ of the clutch. Pressing of the pedal 44 moves the cone-portion 2$^a$ toward the right contrary to the pressure of clutch-spring 2$^b$ and disengages it from its coöperating clutch member 2$^c$ to unclutch the shaft-portions 1, 1$^a$. Releasing of the pedal causes the spring 2$^b$ to engage the cone-portion 2$^a$ with the member 2$^c$ to clutch the shaft-portions 1, 1$^a$, and to simultaneously swing the pedal back toward the right to its normal position shown in the drawing.

A magnet 46 is provided for each of the latches 31 which when energized causes its armature 47 hinged at 48 to press down upon the flange 33 of its latch contrary to the pressure of latch-spring 35. Said armature thereby compels the latch 31 to enter its registering sleeve-notch 38 and to lock its shifting device to the sleeve 25 at the moment said sleeve reaches the termination of the forward portion of its stroke.

Circuits for the magnet 46 are opened and closed by means of a current-conducting arm 49 which is fixed to a rocking rod 50 and may be swung therewith and about the axis thereof to contact a segmental terminal-plate 51 with any one of terminal contacts 52, 53, 54, and 55. The rod 50 extends from the arm 49, Fig. 5, through and outwardly from the steering column 56 of the machine and is provided at its extremity above the steering wheel 57 with a lever 58 wherewith the rod may be rocked to swing the arm 49. A pointer 59 extends from the extremity of lever 58 and around the outer side of a segmental frame 60, which is concentric with the rod 50 and is secured to the column 56 by means of brackets 61. In the frame 60 are provided openings 62 in which are inlaid translucent panes 63 upon which are marked speed indications, such as "Reverse" or "R," "1st," "2nd," and "Direct" or "3rd," and the lever 58 with its pointer 59 may be swung to point to any one of said indications. An incandescent lamp 64 located within a casing 65 at the extremity of lever 58 throws a light against the underside of any one of the panes 63 toward which the lever 58 is directed, whereby it serves to illuminate the particular indication pointed at by the lever-pointer 59 when driving the machine in the dark.

In the operation of the gear transmission the lever 58 may be set to point to any one of the indications upon indicator-frame 60, according to whichever coöperating pair of gears it is desired to mesh in the selection of speeds for the automobile wheels, and we will assume that said lever has been set to point to "1st" speed. The arm 49 is thereby set to join the terminal-contact 54 with the terminal-plate 51 and closes the break 66 of a circuit or branch circuit which when having current therethrough energizes the magnet 46 that belongs to and coöperates with the locking-latch 31 of shifting device 22. Lever 58 having been set to the desired speed indication the remaining step in the operation of selecting a particular speed is to press and release the foot-pedal 44. Upon the pressing of the foot pedal the drive-shaft portions 1, 1ª are unclutched, and during the unclutching operation the rod is actuated and the sleeve 25 thereby moved to perform the forward portion of its stroke toward the left contrary to the pressure of its spring 43. This movement of said sleeve alines its notches 38 with the locking-latches 31 and carries back therewith any shifting device 20, 21, 22, or 23 that may have been locked thereto, and unmeshes or neutralizes the gear connected to such device and locks the device with its gear firmly in neutralized position to the fixed plate 37. At the termination of this movement of the sleeve 25 a pawl 67 hinged at 68 to plate 37 and provided with a tooth 69 drops down upon the sleeve-head 42 and causes said tooth to engage a coöperating tooth 70 of said head and thereby locks the sleeve in shifted position with its spring 43 in compressed state, as shown in Fig. 2. Just prior to the termination of this movement of sleeve 25 and the alinement of its notches 38 with the latches 31, a cam-portion 71 at extremity 72 of said sleeve bears against a rod 73, which is slidable in a bracket 74 secured to plate 37, and causes a conducting-plate 75 to bridge spring-pressed terminal-pins 76, mounted in a guiding frame 74ª secured to bracket 74. The plate 75 is fixed to a bar 77 which joins the rod 73 with a stem 78 that passes through bracket 74 and is pulled by a spring 79, together with the rod 73 and plate 75, in a direction away from the terminal-pins 76. Bridging of the terminal pins 76 conducts the current from battery 80 along wire 81, plate 51, arm 49, terminal 54, wire 82, through the magnet 46 belonging to the latch 31 of shifting device 22, along wires 83, 84, through terminal-pins 76 and conducting bar 75, and along wire 85 back to said battery. Said magnet 46 is thereby energized, and attracting its armature 47 causes the latch 31 of its shifting device 22 to enter into its registering notch 38 of sleeve 25 and to lock said shifting device to said sleeve. Upon the immediate releasing of the pedal 44 the shaft-portions 1, 1ª are clutched, and during the first part of the clutching operation and of the releasing movement of the pedal the actuating-rod 40 moves idly, and then, just prior to the termination of the clutching operation, a cam-portion 86 of the rod-head 41 engages a cam-portion 87 of the pawl 67 and lifts said pawl, Fig. 1, whereby the teeth 69, 70 are disengaged and the sleeve 25 with the compressed spring 43 released. Said spring then momentarily actuates the sleeve 25 and imparting a snap movement thereto moves it to perform the backward portion of its stroke toward the right, upon which movement said sleeve carries therewith the shifting-device 22 locked thereto and shifts it with its gear 13 toward the right and meshes the gears 13, 10. The actual meshing of the gears, therefore, is performed solely by the action of spring 43, which upon being released is permitted to impart the snap movement to the sleeve 25 without any coaction of its actuating rod 40 and independent of the releasing movement or control of the pedal 44 or the operation of the clutch 2. Imparting of a snap movement to the gear as it is meshed with its coöperating gear by means of the free and uncontrolled releasing action of spring 43 is deemed desirable in meshing the gears effectively, for the reason that automatic snap movement which is uniform as to time and power is thereby imparted to the meshing gear and combined with required resiliency, and such meshing action of the gears is conducive to reliability of changing of the speeds and durability of the gear-teeth. During the pressing of the pedal 44 and the unclutching operation, the spring 43 is caused to be compressed while during the releasing of the pedal and first part of the clutching operation the spring 43 is maintained locked in compressed state and its actuating rod 40 and head 41 move idly to clear the sleeve 25 and head 42, and during the termination of the clutching operation said spring is unlocked and permitted to impart the snap-movement to the sleeve 25 which transmits it to the meshing gear. In addition to the mentioned functions of spring 43 it also serves to positively maintain the shifted gear in place and prevents accidental unmeshing thereof. After the sleeve 25 commences to move backwardly to mesh the gears its cam-portion 71 travels away from the rod 73 and thereby allows the spring 79 to withdraw the bridging-plate 75 from the terminal-pins 76, whereupon the circuit energizing said magnet 46 is broken and no more current is utilized during the continuance of the meshing of the gears 13, 10. It will be evident that the entire above described operation, of selecting and shifting the gears, is momentarily performed, requiring on the part of the operator merely the setting of the lever 58 and pressing of the pedal 44.

Should it be desired to unmesh the gears 13, 10, and to mesh any other coöperating pair of gears such as the gears 12, 9 for intermediate speed, the arm 58 is set to point at "2," corresponding to such selection of speed, and the pedal 44 is then pressed and released. Thereupon the actuating-rod 40 moves the sleeve 25 and the shifting device 22 with the gear 13, and thereby unmeshes the gears 13, 10 and locks the said device with the gear 13 to the plate 37 in unmeshed or neutral position. Then the circuit is closed from the battery 80 along wire 81, plate 51, through arm 49 across gap 88, through contact 53, wire 89, through the magnet 46 belonging to the latch 31 of shifting-device 21, along wires 90, 84, through terminal-pins 76 and bridge 75, and along wire 85 back to the battery, whereby said magnet 46 is energized to lock the shifting device 21 to sleeve 25. Thereafter the spring 43 moves the sleeve 25 to shift the device 21 with the gear 12 from neutral position and meshes the gears 12, 9.

It will be seen by following the circuits in the drawing, that in a similar manner setting of the lever 58 to point at "3rd" or highest speed and pressing of the pedal 44 will first unmesh and neutralize any coöperating pair of gears that may be meshed. The magnet 46 belonging to the shifting device 20 will be then energized and will lock said device to the sleeve 25, and said sleeve will then move to mesh the gear 5 with the internal gear 16 for direct driving. Likewise, setting of the lever 58 to point at "Reverse" and pressing of said pedal will energize the magnet 46 of shifting device 23, and will lock said device to the sleeve 25 and move said sleeve to mesh the gears 14, 17 for reversing the automobile wheels.

Should it be desired to unmesh or neutralize any coöperating pair of gears that may be meshed, without necessarily selecting any other speed or meshing any other pair of the gears, the lever 58 may be set to point anywhere between any two of the speed indications upon indicator-frame 60 so that the arm 49 is disposed at a place between any two of the contacts 52, 53, 54, 55, as shown in Fig. 1, whereby upon subsequently pressing of the pedal 44 any gear 5, 12, 13, or 14 that may be in mesh is unmeshed and restored to locked neutral position.

Variations may be resorted to within the scope of the claims, and portions of the improvements may be used without others.

Having thus described my invention, I claim:—

1. In an automobile, the combination with a drive gear, and a transmission gear, of a shifting device for said gears, a spring for actuating said shifting device, mechanical means for compressing said spring, and means to operate said mechanical means to release said spring to permit it to actuate said device to mesh said gears by a free and independent action of the spring independent of movement or control of the mechanical means for compressing said spring.

2. In an automobile, the combination with a drive gear, and a transmission gear, of a shifting device for said gears, a spring for actuating said shifting device, means for preselecting any one of said gears prior to any movement of said shifting device, and mechanical means to release said spring to permit it to actuate said device to mesh said gears by a free and independent action of the spring independent of movement or control of the mechanical means for compressing said spring.

3. In an automobile, the combination with a drive gear, and a transmission gear, of a shifting device for said gears, a spring for actuating said shifting device, mechanical means for actuating said spring, and means to operate said mechanical means to permit the spring to actuate said device to mesh said gears by a free and uncontrolled action of the spring independent of control by the mechanical spring-actuating means.

4. In an automobile, the combination with a drive gear, and a transmission gear, of a spring for meshing said gears, mechanical means to actuate said spring, and means to operate said means to permit said spring to mesh said gears by a free and uncontrolled action of the spring independent of the movement or control of the spring-actuating means.

5. In an automobile, the combination with a drive gear, and a transmission gear, of a spring for meshing said gears, mechanical means to actuate said spring adapted to be under control of the operator, and means to operate said means to permit said spring to mesh said gears by a free and uncontrolled action of said spring independent of the control of the spring-actuating means.

6. In an automobile, the combination with a drive shaft, means to clutch and unclutch said shaft, means to operate said clutching means, a drive gear, and a coöperating transmission gear, of a spring for meshing said gears, mechanical means to actuate said spring operated by said clutch-operating means, and means to permit said spring to mesh said gears by a free and uncontrolled action of the spring independent of the control of said clutch-operating means.

7. In an automobile, the combination with a drive gear, and a transmission gear, of a spring for meshing said gears, a pedal to mechanically actuate said spring therewith, and means to operate said pedal to permit said spring to mesh said gears independent of the control of the pedal.

8. In an automobile, the combination with a drive shaft, a clutch therefor, a pedal for operating said clutch, a drive gear, and a coöperating transmission gear, of a spring for meshing said gears adapted to be mechanically actuated by said pedal, and means to operate the pedal to permit said spring to mesh said gears independent of the control of said pedal.

9. In an automobile, the combination with a drive shaft, means to clutch and unclutch said shaft, means to operate said clutching means, a drive gear, and a coöperating transmission gear, of a spring for meshing said gears, means to actuate said spring operated by said clutch-operating means and to free said spring to mesh said gears during the clutching operation of said shaft independent of the control of said clutch-operating means.

10. In an automobile, the combination with a drive shaft, means to clutch and unclutch said shaft, means to operate said clutching means, a drive gear and a coöperating transmission gear, of a spring for meshing said gears, means to actuate said spring operated by said clutch-operating means during the unclutching operation of said shaft, said spring being permitted to mesh said gears during the clutching operation of said shaft independent of the control of said clutch-operating means, and means for selecting a gear operable before operation of the means for actuating the spring.

11. In an automobile, the combination with a drive shaft, a clutch therefor, a pedal for operating said clutch, a drive gear, and a coöperating transmission gear, of a spring for meshing said gears adapted to be actuated by said pedal, and means to permit said spring to mesh said gears during the clutching operation of said shaft independent of the control of said pedal, and means for selecting a gear prior to the actuation of the pedal.

12. In an automobile, the combination with a drive shaft, a clutch therefor, a pedal for operating said clutch, a drive gear, and a coöperating transmission gear, of a spring for meshing said gears adapted to be actuated by said pedal during the unclutching operation of said shaft, and means to permit said spring to mesh said gears during the clutching operation of said shaft independent of the control of said pedal, and means for selecting a gear prior to the unclutching operation.

13. In an automobile, the combination with a drive shaft, a clutch therefor, an operating pedal for said clutch adapted to be pressed to unclutch said shaft and to clutch said shaft when released, a drive gear, and a coöperating transmission gear, of a spring for meshing said gears adapted to be actuated by said pedal while it is pressed to unclutch said shaft, and means to permit said spring to mesh said gears independent of the control of said pedal while it is released to clutch said shaft, and means for selecting a gear prior to actuation of the pedal.

14. In an automobile, the combination with a drive shaft, means to clutch and unclutch said shaft, means to operate said clutching means, a drive gear, and a coöperating transmission gear, of a spring for meshing said gears, means to actuate said spring operated by said clutch-operating means, and means to permit said spring to mesh said gears during the termination of the clutching operation of said shaft by a free and uncontrolled action of said spring independent of the control of said clutch-operating means.

15. In an automobile, the combination with a drive shaft, a clutch therefor, a pedal for operating said clutch, a drive gear, and a coöperating transmission gear, of a spring for meshing said gears adapted to be actuated by said pedal, and means to permit said spring to mesh said gears during the termination of the clutching operation of said shaft by a free and uncontrolled action of said spring independent of the control of said pedal.

16. In an automobile, the combination with a drive shaft, a clutch therefor, an operating pedal for said clutch adapted to be pressed to unclutch said shaft and to clutch said shaft when released, a drive gear, and a coöperating transmission gear, of a spring for meshing said gears adapted to be actuated by said pedal while it is pressed to unclutch said shaft, and means to permit said spring to mesh said gears by a free and uncontrolled action of said spring independent of the control of said pedal while it is released to clutch said shaft and during the termination of the clutching operation of said shaft.

17. In an automobile, the combination with a drive gear, and a transmission gear, of a spring for meshing said gears, means to actuate said spring, means to lock said spring in actuated state, and means to operate said actuating means to unlock said spring to permit it to mesh said gears.

18. In an automobile, the combination with a drive gear, and a transmission gear, of a spring for meshing said gears, means to actuate said spring adapted to be under the control of the operator, means to lock said spring in actuated state, and means to operate said actuating means to unlock said spring to permit it to mesh said gears independent of the control of said spring-actuating means.

19. In an automobile, the combination with a drive shaft, means to clutch and unclutch said shaft, means to operate said clutching means, a drive gear, and a coöperating transmission gear, of a spring for meshing said gears, means to actuate said spring operated by said clutch-operating means, means to lock said spring in actuated state, and means to unlock said spring to permit it to mesh said gears during the clutching operation of said shaft and by a free and uncontrolled action of said spring independent of the control of said clutch operating means.

20. In an automobile, the combination with a drive shaft, means to clutch and unclutch said shaft, means to operate said clutching means, a drive gear, and a coöperating transmission gear, of a spring for meshing said gears, means to actuate said spring operated by said clutch-operating means, means to lock said spring in actuated state, and means to unlock said spring to permit it to mesh said gear during the clutching operation of said shaft and by a free and uncontrolled action of said spring independent of the control of said clutch-operating means.

21. In an automobile, the combination with a drive shaft, means to clutch and unclutch said shaft, means to operate said clutching means, a drive gear, and a coöperating transmission gear, of a spring for meshing said gears, means to actuate said spring operated by said clutch-operating means, means to lock said spring in actuated state at the unclutching operation of said shaft, and means to unlock said spring at the clutching operation of said shaft to permit said spring to mesh said gears during said clutching operation and by a free and uncontrolled action of said spring independent of the control of said clutch-operating means.

22. In an automobile the combination with a drive shaft, a clutch therefor, an operating pedal for said clutch adapted to be pressed to unclutch said shaft and to clutch said shaft when released, a drive gear, and a coöperating transmission gear, of a spring for meshing said gears adapted to be actuated by said pedal while it is pressed to unclutch said shaft, means to lock said spring in actuated state, and means to unlock said spring to permit it to mesh said gears by a free and uncontrolled action of said spring independent of the control of said pedal while the pedal is released to clutch said shaft.

23. In an automobile, the combination with a drive shaft, means to clutch and unclutch said shaft, means to operate said clutching means, a drive gear, and a coöperating transmission gear, of a spring for meshing said gears, means to actuate said spring operated by said clutch-operating means, means to lock said spring in actuated state, and means to unlock said spring during the termination of the clutching operation to permit the spring to mesh said gears during the clutching operation of said shaft and by a free and uncontrolled action of said spring independent of the control of said clutch-operating means.

24. In an automobile, the combination with a drive shaft, a clutch therefor, an operating pedal for said clutch adapted to be pressed to unclutch said shaft and to clutch said shaft when released, a drive gear, and a coöperating transmission gear, of a spring for meshing said gears adapted to be actuated by said pedal while it is pressed to unclutch said shaft, means to lock said spring in actuated state, and means to unlock said spring during the termination of the releasing of said pedal to permit the spring to mesh said gears by a free and uncontrolled action of said spring independent of the control of said pedal during the termination of its releasing stroke.

25. In an automobile, the combination with a drive shaft, a clutch therefor, an operating pedal for said clutch adapted to be pressed to unclutch said shaft and to clutch said shaft when released, a drive gear, and a coöperating transmission gear, of a spring for meshing said gears adapted to be actuated by said pedal while it is pressed to unclutch said shaft, a pawl for locking said spring in actuated state, and means to actuate said pawl to unlock said spring during the termination of the releasing of said pedal to permit the spring to mesh said gears independent of the control of said pedal during the termination of its releasing stroke.

26. In an automobile, the combination with a drive gear, and a transmission gear, of a spring for meshing said gears, means to actuate said spring, means to lock said spring in actuated state, and said spring-actuating means actuating said locking means to unlock said spring to permit it to mesh said gears.

27. In an automobile, the combination with a drive gear, and a transmission gear, of a spring for meshing said gears, means to actuate said spring adapted to be under control of the operator, and said spring-actuating means actuating said locking means to unlock said spring to permit it to mesh said gears independent of the control of said spring-actuating means.

28. In an automobile, the combination with a drive shaft, means to clutch and unclutch said shaft, means to operate said clutching means, a drive gear, and a coöperating transmission gear, of a spring for meshing said gears, means to actuate said spring operated by said clutch-operating means, means to lock said spring in actuated state, and said spring-actuating means actuating said locking means to unlock said spring to permit it to mesh said gears independent of the control of said clutch-operating means.

29. In an automobile, the combination with a drive shaft, means to clutch and unclutch said shaft, means to operate said clutching means, a drive gear, and a coöperating transmission gear, of a spring for meshing said gears, means to actuate said spring operated by said clutch-operating means, means to lock said spring in actuated state, and said spring-actuating means actuating said locking means to unlock said spring during the termination of the clutching operation to permit the spring to mesh said gears during the clutching operation of said shaft independent of the control of said clutch-operating means.

30. In an automobile, the combination with a drive gear, and a transmission gear, of a shifting device for said gears, a spring for actuating said shifting device, an operating pedal, means operated thereby to actuate said spring, means to lock said device and spring, and said spring-actuating means actuating said locking means to unlock said spring to permit it to actuate said device to mesh said gears.

31. In an automobile, the combination with drive gears, and coöperating transmission gears, of a shifting device for each coöperating pair of said gears, a movable member, means to lock any one of said devices to said member, a spring for moving said member and actuating means for placing said spring under compression, the said actuating means permitting free and uncontrolled action of the spring in moving said member.

32. In an automobile, the combination with drive gears, and coöperating transmission gears, of a shifting device for each coöperating pair of said gears, a movable member, means to lock any one of said devices to said member, a spring for moving said member, means to actuate said spring, and means to permit said spring to move said member by a free and uncontrolled action independent of control by said spring-actuating means.

33. In an automobile, the combination with drive gears, and coöperating transmission gears, of a shifting device for each coöperating pair of said gears, a movable member, means to lock any one of said devices to said member, a spring for moving said member, means to actuate said spring adapted to be under control of the operator, and means to permit said spring to move said member by a free and uncontrolled action of said spring independent of the control of said spring-actuating means.

34. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, and means to actuate said spring operated by said clutching means, said spring-actuating means permitting free and uncontrolled action of said spring independent of said clutching means when the spring moves said member.

35. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, means to actuate said spring operated by said clutching means, and means to permit said spring to move said member independent of the control of said clutch-operating means.

36. In an automobile, the combination with drive gears, and coöperating transmission gears, of a shifting device for each coöperating pair of said gears, a movable member, means to lock any one of said devices to said member, a spring for moving said member, an operating pedal to move said member and actuate said spring, and means to permit said spring to move said member independent of the control of said pedal.

37. In an automobile, the combination with drive gears, and coöperating transmission gears, of a shifting device for each coöperating pair of said gears, a movable member, means to lock any one of said devices to said member, a spring for moving said member, means to move said member in one direction and actuate said spring, and means to permit said spring to move said member in an opposite direction independent of the control of said spring-actuating means.

38. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, means to move said member in one direction and actuate said spring operated by said clutch-operating means, and means to permit said spring to move said member in an opposite direction and to shift said device independent of the control of said clutch operating means.

39. In an automobile, the combination with drive gears, and coöperating transmission gears, of a shifting device for each coöperating pair of said gears, a movable member, means to lock any one of said devices to said member, a spring for moving said member, an operating pedal to move said member in one direction to actuate said spring, and means to permit said spring to move said member in an opposite direction and to shift said device independent of the control of said pedal.

40. In an automobile, the combination with a drive shaft, a clutch therefor, a pedal for operating said clutch, drive gears, and coöperating transmission gears, of a shifting device for each coöperating pair of said gears, a movable member, means to lock any one of said devices to said member, a spring for moving said member adapted to be actuated by said pedal, and means to permit said spring to move said member and connected device independent of the control of said pedal.

41. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, means to actuate said spring operated by said clutching means, and means to permit said spring to move said member and connected device during the clutching operation of said shaft independent of the control of said clutch operating means.

42. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, means to actuate said spring operated by said clutching means during the unclutching operation of said shaft, and means to permit said spring to move said member and connected device during the clutching operation of said shaft independent of the control of said clutch operating means.

43. In an automobile, the combination with a drive shaft, a clutch therefor, a pedal for operating said clutch, drive gears, and coöperating transmission gears, of a shifting device for each coöperating pair of said gears, a movable member, means to lock any one of said devices to said member, a spring for moving said member adapted to be actuated by said pedal during the unclutching operation of said shaft, and means to permit said spring to move said member and locked device during the clutching operation of said shaft independent of the control of said pedal.

44. In an automobile, the combination with a drive shaft, a clutch therefor, an operating pedal for said clutch adapted to be pressed to unclutch said shaft and to clutch said shaft when released, drive gears, and coöperating transmission gears, of a shifting device for each coöperating pair of said gears, a movable member, means to lock any one of said devices to said member, a spring for moving said member adaptable to be actuated by said pedal while it is pressed to unclutch said shaft, and means to permit said spring to move said member and connected device independent of the control of said pedal while it is released to clutch said shaft.

45. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, means to actuate said spring operated by said clutching means, and means to permit said spring to move said member during the termination of the clutching operation independent of the control of said clutch-operating means.

46. In an automobile, the combination with a drive shaft, a clutch therefor, a pedal for operating said clutch, drive gears, and coöperating transmission gears, of a shifting device for each coöperating pair of said gears, a movable member, means to lock any one of said devices to said member, a spring for moving said member adapted to be actuated by said pedal, and means to permit said spring to move said member and connected device during the termination of the clutching operation independent of the control of said pedal.

47. In an automobile, the combination with drive gears, and coöperating transmission gears, of a shifting device for each coöperating pair of said gears, a movable member, means to lock any one of said devices to said member, a spring for moving said member, means to actuate said spring, means to lock said spring in actuated state, and means to unlock said spring to permit it to move said member and connected device.

48. In an automobile, the combination with drive gears, and coöperating transmission gears, of a shifting device for each coöperating pair of said gears, a movable member, means to lock any one of said devices to said member, a spring for moving said member, means to actuate said spring adapted to be under control of the operator, means to lock said spring in actuated state, and means to unlock said spring to permit it to move said member and connected device independent of the control of said spring-operating means.

49. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, means to actuate said spring operated by said clutching means, means to lock said spring in actuated state, and means to unlock said spring to permit it to move said member and connected device independent of the control of said clutch-operating means.

50. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, means to actuate said spring operated by said clutching means, means to lock said spring in actuated state, and means to unlock said spring to permit it to move said member and connected device during the clutching operation of said shaft independent of the control of said clutch-operating means.

51. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, means to actuate said spring operated by said clutching means, means to lock said spring in actuated state at the unclutching operation of said shaft, and means to unlock said spring at the clutching operation of said shaft to permit the spring to move said member and connected device during said clutching operation independent of the control of said clutch-operating means.

52. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, and means to actuate said spring operated by said clutch-operating means to permit the spring to move said member and connected device during the clutching operation of said shaft independent of the control of said clutch-operating means.

53. In an automobile, the combination with drive gears, and coöperating transmission gears, of a shifting device for each coöperating pair of said gears, a movable member, means to lock any one of said devices to said member, a spring for moving said member, means to actuate said spring, means to lock said spring in actuated state, and said spring-actuating means actuating said locking means to unlock said spring to permit it to move said member and connected device.

54. In an automobile, the combination with drive gears, and coöperating transmission gears, of a shifting device for each coöperating pair of said gears, a movable member, means to lock any one of said devices to said member, a spring for moving said member, means to actuate said spring adapted to be under control of the operator, means to lock said spring in actuated state, and said spring-actuating means actuating said locking means to unlock said spring to permit it to move said member and connected device independent of the control of said spring actuating means.

55. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, means to actuate said spring operated by said clutching means, means to lock said spring in actuated state, and said spring-actuating means actuating said locking means to unlock said spring to permit it to move said member and connected device independent of the control of said clutch-operating means.

56. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, a spring for moving said member, means to actuate said spring operated by said clutching means, means to lock said spring in actuated state, and said spring-actuating means actuating said locking means to unlock said spring during the termination of the clutching operation to permit the spring to move said member and connected device during the clutching operation of said shaft independent of the control of said clutch operating means.

57. In an automobile, the combination with drive gears, and coöperating transmission gears, of a shifting device for each coöperating pair of said gears, a movable member, means to lock any one of said devices to said member, a spring for moving said member, an operating pedal, means operated thereby to actuate said spring, means to lock said member and spring, and said actuating means actuating said locking means to unlock said spring to permit it to move said member and connected device.

58. In an automobile, the combination with drive gears, and coöperating transmission gears for driving the wheels, of a shifting device for each coöperating pair of said gears, a movable member, means to lock any one of said devices to said member, an actuating member for said movable member, means to move said actuating member partially independently and partially together with said movable member in one direction and partially independently and partially together with said member in an opposite direction, and means to actuate said movable member and connected device independent of the movement of said actuating member.

59. In an automobile the combination with drive gears, and coöperating transmission gears for driving the wheels, of a shifting device for each coöperating pair of said gears, a movable sleeve, means to lock any one of said devices to said sleeve, a rod to move said sleeve extending through the bore thereof, and means to move said actuating rod partially independently and partially together with said sleeve.

60. In an automobile, the combination with drive gears, and coöperating transmission gears for driving the wheels, of a shifting device for each coöperating pair of said gears, a movable sleeve, means to lock any one of said devices to said sleeve, an actuating rod for said sleeve extending through the bore thereof, means to move said rod partially independently and partially together with said sleeve and connected device in one direction, and partially independently and partially together with said sleeve in an opposite direction.

61. In an automobile, the combination with drive gears, and coöperating transmission gears for driving the wheels, of a shifting device for each coöperating pair of said gears, a movable sleeve, means to lock any one of said devices to said sleeve, an actuating rod for said sleeve extending through the bore thereof, means to move said rod partially independently and partially together with said sleeve and connected device in one direction and partially independently and partially together with said sleeve in an opposite direction, and means to actuate said sleeve and connected device independent of the movement of said rod.

62. In an automobile, the combination with a drive shaft, means to clutch and unclutch said shaft, means to operate said clutching means, drive gears, and coöperating transmission gears for driving the wheels, of a shifting device for each coöperating pair of said gears, a movable member, means to lock any one of said devices to said member, an actuating member for said movable member operated by said clutch operating means, means to move said actuating member partially independently and partially together with said movable member upon the operation of said clutch-operating means, and means to actuate said movable member independent of said actuating member.

63. In an automobile, the combination with a drive shaft, means to clutch and unclutch said shaft, means to operate said clutching means, drive gears, and coöperating transmission gears for driving the wheels, of a shifting device for each coöperating pair of said gears, a movable member, means to lock any one of said devices to said member, an actuating member for said movable member operated by said clutch operating means, means to move said actuating member partially independently and partially together with said movable member upon the operation of said clutch-operating means, and means to actuate said movable member independent of said actuating member upon the clutching operation of said shaft.

64. In an automobile, the combination with a drive shaft, a clutch therefor, an operating pedal for said clutch adapted to be pressed to unclutch said shaft, and to clutch said shaft when released, drive gears, and coöperating transmission gears, of a shifting device for each coöperating pair of said gears, a movable member, means to lock any one of said devices to said member, an actuating member for said movable member operated by said pedal, means to move said actuating member partially independently and partially together with said movable member upon the operation of said pedal, and means to actuate said movable member and connected device independent of said actuating member upon the releasing of said pedal to clutch said shaft.

65. In an automobile, the combination with drive gears, and coöperating transmission gears for driving the wheels, of a shifting device for each coöperating pair of said gears, a movable member, means to lock any one of said devices to said member, an actuating member for said movable member, means to move said actuating member partially independently and partially together with said movable member, and a spring to actuate said movable member and connected device independent of the movement of said actuating member.

66. In an automobile, the combination with drive gears, and coöperating transmission gears for driving the wheels, of a shifting device for each coöperating pair of said gears, a movable sleeve, means to lock any one of said devices to said sleeve, an actuating rod for said sleeve extending through the bore thereof, means to move said rod partially independently and partially together with said sleeve, and a spring to actuate said sleeve and connected device independent of the movement of said rod.

67. In an automobile, the combination with a drive shaft, means to clutch and unclutch said shaft, means to operate said clutching means, drive gears, and coöperating transmission gears for driving the wheels, of a shifting device for each coöperating pair of said gears, a movable member, means to lock any one of said devices to said member, an actuating member for said movable member operated by said clutch-operating means, means to move said actuating member partially independently and partially together with said movable member upon the operation of said clutch operating means, and a spring to actuate said movable member independent of said actuating member and the control of said clutch operating means.

68. In an automobile, the combination with a drive shaft, means to clutch and unclutch said shaft, means to operate said clutching means, drive gears, and coöperating transmission gears for driving the wheels, of a shifting device for each coöperating pair of said gears, a movable member, means to lock any one of said devices to said member, an actuating member for said movable member operated by said clutch-operating means, means to move said actuating member partically independently and partially together with said movable member upon the operation of said clutch operating means, and a spring to actuate said movable member independent of said actuating member and the control of said clutch operating means upon the clutching operation of said shaft.

69. In an automobile, the combination with a drive shaft, a clutch therefor, an operating pedal for said clutch adapted to be pressed to unclutch said shaft and to clutch said shaft when released, drive gears, and coöperating transmission gears for driving the wheels, of a shifting device for each coöperating pair of said gears, a movable member, means to lock any one of said devices to said member, an actuating member for said movable member operated by said pedal, means to move said actuating member partially independently and partially together with said movable member upon the operation of said pedal, and a spring to actuate said movable member and connected device independent of said actuating member and control of said pedal upon the releasing of said pedal to clutch said shaft.

70. In an automobile the combination with a drive shaft, a clutch therefor, a pedal for operating said clutch, drive gears, and coöperating transmission gears for driving the wheels, of a shifting device for each coöperating pair of said gears, a movable member, means to lock any one of said devices to said member, an actuating member for said movable member operated by said pedal, means to move said actuating member partially independently and partially together with said movable member upon the operation of said pedal, and a spring to actuate said movable and connected device independently of said actuating member and control of said pedal upon the operation of said pedal.

71. In an automobile, the combination with drive gears, and coöperating transmission gears for driving the wheels, of a shifting device for each coöperating pair of said gears, a movable member, means to lock any one of said devices to said member, an actuating member for said movable member, means to move said actuating member partially independently and partially together with said movable member, a spring to actuate said movable member, means to lock said movable member when actuated, and means to unlock said movable member to permit said spring to move it with its connected device independent of said actuating member.

72. In an automobile, the combination with a drive shaft, means to clutch and unclutch said shaft, means to operate said clutching means, drive gears, and coöperating transmission gears for driving the wheels, of a shifting device for each coöperating pair of said gears, a movable member, means to lock any one of said devices to said member, an actuating member for said movable member operated by said clutch-operating means, means to move said member partially independently and partially together with said movable member upon the operation of said clutch operating means, a spring to actuate said movable member, means to lock said movable member when actuated, and means to unlock said movable member to permit said spring to move it with its connected device independent of said actuating member and the control of said clutch operating means.

73. In an automobile, the combination with a drive shaft, a clutch therefor, an operating pedal for said clutch adapted to be pressed to unclutch said shaft and to clutch said shaft when released, drive gears, and coöperating transmission gears for driving the wheels, of a shifting device for each coöperating pair of said gears, a movable member, means to lock any one of said devices to said member, a spring to actuate said movable member, means to lock said movable member when actuated, and means to unlock said movable member to permit said spring to move it with its connected device independent of said actuating member and control of said pedal upon the releasing of said pedal to clutch said shaft.

74. In an automobile, the combination with a drive shaft, a clutch therefor, an operating pedal for said clutch adapted to be pressed to unclutch said shaft and to clutch said shaft when released, drive gears, and coöperating transmission gears for driving the wheels, of a shifting device for each coöperating pair of said gears, a movable member, means to lock any one of said devices to said member, a circuit for each of said devices having means to operate said locking means to lock the device to said member, a spring to actuate said movable member, means to lock said movable member when actuated, and means to unlock said movable member to permit said spring to move it with its connected device independent of said actuating member and control of said pedal upon the releasing of said pedal to clutch said shaft.

75. In an automobile, the combination with a drive shaft, a clutch therefor, a pedal for operating said clutch, drive gears, and coöperating transmission gears for driving the wheels, of a shifting device for each coöperating pair of said gears, a movable member, means to lock any one of said devices to said member, an actuating member for said movable member operated by said pedal, means to move said member partially independently and partially together with said movable member upon the operation of said pedal, a spring to actuate said movable member, means to lock said movable member when actuated, and means to unlock said movable member to permit said spring to move it with its connected device independent of said actuating member and control of said pedal upon the operation of said pedal.

76. In an automobile, the combination with drive gears, and coöperating transmission gears for driving the wheels, of a shifting device for each coöperating pair of said gears, a movable member, means to move said member, means to lock any one of said devices to said member, a circuit for each of said devices having means to operate said locking means to lock said device to said member, means to close any one of said circuits, and said member when moved actuating said closing means to close and break the circuit.

77. In an automobile, the combination with drive gears, and coöperating transmission gears for driving the wheels, of a shifting device for each coöperating pair of said gears, a movable member, means to move said member, means to lock any one of said devices to said member, a circuit for each of said devices having means to operate said locking means to lock said device to said member, and means to close and break any one of said circuits through the medium of the movement of said member.

78. In an automobile, the combination with drive gears, and coöperating transmission gears for driving the wheels, of a shifting device for each coöperating pair of said gears, a movable member, means to move said member, means to lock any one of said devices to said member, a circuit for each of said devices having means to operate said locking means to lock said device to said member, means to close and break any one of said circuits through the medium of the movement of said member, and said member when moved closing any one of the circuits to lock its device thereto and breaking the circuit upon the shifting of the device therewith.

79. In an automobile, the combination with drive gears, and coöperating transmission gears for driving the wheels, of a shifting device for each coöperating pair of said gears, a movable member, means to move said member in opposite directions, means to lock any one of said devices to said member, a circuit for each of said devices having means to operate said locking means to lock said device to said member, means to close and break any one of said circuits through the medium of the movement of said member, and said member when moved in one direction closing any one of said circuits to lock its device thereto and breaking said circuit when moving oppositely upon the shifting of its device therewith.

80. In an automobile, the combination with drive gears, and coöperating transmission gears for driving the wheels, of a shifting device for each coöperating pair of said gears, a movable member, means to lock any one of said devices to said member, a circuit for each of said devices having means to operate said locking means to lock the device to said member, a spring for moving said member, means to actuate said spring, and means to permit said spring to move said member independent of said spring-actuating means.

81. In an automobile, the combination with a drive shaft, means to clutch and unclutch said shaft, means to operate said clutching means, drive gears, and coöperating transmission gears for driving the wheels, of a shifting device for each coöperating pair of said gears, a movable member, means to lock any one of said devices to said member, a circuit for each of said devices having means to operate said locking means to lock the device to said member, a spring for moving said member, means to actuate said spring operated by said clutch-operating means, and means to permit said spring to move said member independent of the control of said clutch-operating means.

82. In an automobile, the combination with a drive shaft, a clutch therefor, a pedal for operating said clutch, drive gears, and coöperating transmission gears for driving the wheels, of a shifting device for each coöperating pair of said gears, a movable member, means to lock any one of said devices to said member, a circuit for each of said devices having means to operate said locking means to lock the device to said member, a spring for moving said member adapted to be actuated by said pedal, and means to permit said spring to move said member and connected device independent of the control of said pedal.

83. In an automobile, the combination with drive gears, and coöperating transmission gears for driving the wheels, of a shifting device for each coöperating pair of said gears, a movable member, means to lock any one of said devices to said member, a circuit for each of said devices having means to operate said locking means to lock said device to said member, an actuating member for said movable member, and means to move said actuating-member partially independently and partially together with said moveable member.

84. In an automobile, the combination with drive gears, and coöperating transmission gears for driving the wheels, of a shifting device for each coöperating pair of said gears, a movable member, means to lock any one of said devices to said member, a circuit for each of said devices having means to operate said locking means to lock said device to said member, an actuating member for said movable member, and means to actuate said movable member and connected device independent of the movement of said actuating-member.

85. In an automobile, the combination with drive gears, and coöperating transmission gears, of a shifting device for each coöperating pair of said gears, mechanism for shifting any one of said devices, circuits having means to operate said mechanism, closers for said circuits, a lever for closing any one of said circuits, a translucent indicator for said lever indicating therealong the selection of said circuits, and a lamp on said lever at the reverse side of said indicator to illuminate any one indication thereof individually.

86. The combination of a drive shaft, a driven shaft, a countershaft, gears on said shafts, a pair of said gears driving said countershaft from said drive shaft and one gear of said pair being shiftable on the drive shaft, means to mesh a pair of said gears to drive said driven shaft from said drive shaft through said countershaft, and means to shift the gear on the drive shaft and at the same time couple the drive and driven shafts independently of the countershaft to drive said driven shaft directly from the drive shaft without rotating said countershaft.

87. The combination of a drive shaft, a driven shaft, a countershaft, gears on said shafts, a pair of said gears driving said countershaft from said drive shaft, one of said pair of gears being shiftable on the drive shaft, means to mesh another pair of said gears to drive said driven shaft from said drive shaft through said countershaft, one of said first pair of gears having an internal gear, and the other of said first pair of gears adaptable to be meshed with said internal gear to drive directly said driven shaft from said drive shaft.

88. The combination of a drive shaft, a driven shaft, a countershaft, gears on said shafts, a pair of said gears driving said countershaft from said drive shaft, one of said pair of gears being shiftable on the drive shaft, means to mesh a pair of said gears to drive said driven shaft from said drive shaft through said countershaft, one of said first pair of gears having an internal gear, and the other of said gears shiftable on the drive shaft being adaptable to be meshed with said internal gear to drive directly said driven shaft from said drive shaft without rotating said countershaft.

89. In an automobile, the combination of a split drive shaft, gears thereon, a countershaft, coöperating gears on said countershaft, means to select and mesh any coöperating pair of said gears, a pair of said coöperating gears driving said countershaft, a pair of said coöperating gears adapted to drive one portion of said drive shaft from the other portion thereof through said countershaft, one of said gears having an internal gear, and the gear of said coöperating gears which drive the countershaft adaptable to be meshed with said internal gear to drive directly one of said drive-shaft portions from the other of said drive-shaft portions without rotating said countershaft and all of the movements of said gears to effect meshing being in the same direction and in an opposite direction the same for all to effect unmeshing.

90. In an automobile, the combination of a split drive shaft, gears on the driven portion thereof, a countershaft, coöperating gears on said countershaft, means to select and mesh any coöperating pair of said gears independently of one another by a meshing movement in the same direction for all, a pair of gears driving said countershaft for driving one portion of said drive shaft from the other portion thereof through said countershaft, and means to drive one of said drive shaft portions directly from the other of said drive shaft portions without rotating said countershaft.

91. In a speed controlling mechanism, the combination of a clutch pedal, a shiftable gear, means for unmeshing the same by the action of the clutch pedal, means for meshing the same by the action of a spring, means for temporarily locking the spring out of action and means for releasing said spring during the return movement of the clutch operated pedal to engage the clutch.

92. In a speed controlling mechanism, the combination of a shiftable gear, means for unmeshing the same, a spring compressed by the operation of said unmeshing means when operated in one direction, a pawl for holding the spring out of action and releasing device connected with the unmeshing means and adapted to release the pawl on the reverse movement of said unmeshing means to allow the spring to act and mesh said gear.

Signed at the city of New York, in the county of New York, and State of New York, this 26th day of August, A. D. 1915.

MERION J. HUGGINS.

Witnesses:
CHAS. W. LE RUE,
B. ROMAN.

Copies of this patent may be obtained for five cents each, by addressing the "Commissioner of Patents. Washington, D. C."